United States Patent [19]
Katsuro et al.

[11] Patent Number: 6,131,409
[45] Date of Patent: Oct. 17, 2000

[54] PROCESS FOR PRODUCING A HIGH PURITY SYNTHETIC QUARTZ

[75] Inventors: Yoshio Katsuro; Takanobu Katsuki; Akihiro Takazawa; Hanako Kato; Akira Utsunomiya, all of Kitakyushu, Japan

[73] Assignee: Mitsubishi Chemical Corporation, Tokyo, Japan

[21] Appl. No.: 08/952,495

[22] PCT Filed: May 23, 1996

[86] PCT No.: PCT/JP96/01362

§ 371 Date: Nov. 26, 1997

§ 102(e) Date: Nov. 26, 1997

[87] PCT Pub. No.: WO96/37434

PCT Pub. Date: Nov. 28, 1996

[30]     Foreign Application Priority Data

| May 26, 1995 | [JP] | Japan | 7-128328 |
| Nov. 28, 1995 | [JP] | Japan | 7-309216 |
| Nov. 29, 1995 | [JP] | Japan | 7-310832 |
| Nov. 29, 1995 | [JP] | Japan | 7-310833 |

[51] Int. Cl.$^7$ ............................ C03B 8/00; C03B 19/01
[52] U.S. Cl. ............. 65/17.2; 65/17.3; 65/DIG. 8; 556/466
[58] Field of Search ................ 65/17.2, 17.3, 65/DIG. 8; 556/466

[56]     References Cited

U.S. PATENT DOCUMENTS 5,902,893   5/1999   Laxman .................... 556/466

*Primary Examiner*—Stanley S. Silverman
*Assistant Examiner*—Jacqueline A Ruller
*Attorney, Agent, or Firm*—Oblon, Spivak, McClelland, Maier & Neustadt, P.C.

[57]     ABSTRACT

A method for producing a high purity synthetic quartz powder, characterized by using a tetramethoxysilane having a trimethoxymethylsilane content of at most 0.3 wt %, and converting it to a synthetic quartz by a sol-gel method.

14 Claims, No Drawings

PROCESS FOR PRODUCING A HIGH PURITY SYNTHETIC QUARTZ

TECHNICAL FIELD

The present invention relates to a high purity synthetic quartz powder and a shaped product of quartz glass, and a high purity tetraalkoxysilane useful as their starting material and a method for its production.

BACKGROUND ART

In recent years, for glass products used in the field of optical communication or in the semiconductor industry or the like, a very strict control is carried out with respect to their minor impurities and fine bubbles in the products. For example, in a case where the glass product is a crucible for pulling up a silicon single crystal, if it contains minor impurities, the minor impurities eluted from the crucible will be entrapped in the silicon single crystal and deteriorate the performance of the semiconductor. Especially, Group III–V elements such as phosphorus and boron substantially influence the semiconductor properties, and a special attention is paid to them. Further, in the case of a quartz jig to be used at a high temperature, Group III–V elements contained in the shaped product of quartz will diffuse and contaminate a silicon wafer, whereby the desired semiconductor properties can hardly be obtained. Further, if the crucible contains fine bubbles, there will be a problem such that they not only cause disturbance of the liquid surface during pulling up of a silicon single crystal and formation of crystal defects, but also deteriorate the durability of the crucible.

Such high quality glass is produced mainly by e.g. (1) a method of purifying natural quartz, (2) a method in which a fume generated by decomposition of silicon tetrachloride in an oxyhydrogen flame is deposited and grown on a substrate, or (3) a method in which a silica gel obtained by e.g. hydrolysis and gelation of e.g. a silicon alkoxide, is baked and a synthetic quartz powder thereby obtained is employed.

However, the method (1) has a problem that there is a limit in reducing the content of minor impurities, and the method (2) has a problem that the production cost is extremely high. On the other hand, in the method (3) wherein a silica gel, particularly a silica gel derived from a silicon alkoxide, is employed, it is possible to obtain a synthetic quartz powder having relatively low content of minor impurities, but the desired level is not necessarily satisfied. Further, by this method (3), fine bubbles are likely to form in the shaped product as the final product, thus leading to the above-mentioned problem caused by fine bubbles.

DISCLOSURE OF THE INVENTION

In view of the above-mentioned circumstances, the present inventors have conducted an extensive research on a method for producing a synthetic quartz powder or its molded product, wherein, as compared with conventional products, the content of minor impurities is low, particularly the content of phosphorus and boron is low, and formation of fine bubbles is very little, by using a silica gel obtained by hydrolysis and gelation of a silicon alkoxide. As a result, they have found that the main cause of these problems resides in a specific compound in the starting material silicon alkoxide, further that minor impurities are entrained from the reaction mixture and from the apparatus, that phosphorus in the starting material alkoxide, which is the main cause of the problems, can be substantially reduced under a specific distillation condition, and that phosphorus and boron in the staring material alkoxide have an interrelation with the content of the specific compound in the alkoxide; and they have arrived at the present invention.

Namely, the present invention resides in a method for producing a high purity synthetic quartz powder, characterized by using a tetraalkoxysilane having a trialkoxyalkylsilane content of at most 0.3 wt %, and converting it to a synthetic quartz by a sol-gel method; etc.

Now, the present invention will be described in detail.

The crude tetraalkoxysilane to be used in the present invention, can be obtained by reacting metallic silicon with an aliphatic alcohol, as shown by the following formula (1):

$$Si + 4ROH \rightarrow Si(OR)_4 + 2H_2 \quad (1)$$

wherein R is an alkyl group.

As the aliphatic alcohol, a $C_{1-10}$ monovalent aliphatic alcohol is preferably employed. For example, methanol, ethanol, n-propanol, isopropanol, n-butanol or amyl alcohol may be mentioned.

The amount of the aliphatic alcohol is selected within a range of from 3 to 50 mol times, particularly preferably from 4 to 10 mol times, to one mol of metallic silicon. If it is less than 3 mol times, unreacted metallic silicon will remain in a large amount, and the productivity will be low. On the other hand, if it exceeds 50 mol times, an unreacted aliphatic alcohol will remain in a large amount, and a large quantity of energy will be required for separation and purification.

As the solvent for the reaction, hydrocarbon solvents can be widely used. However, a high boiling point solvent which can easily be separated from the tetraalkoxysilane, is suitable for use. As such a high boiling point solvent, an alkylbenzene compound such as triethylbenzene, octylbenzene, dodecylbenzene or didodecylbenzene, or an arylmethane compound such as diphenylmethane, benzyltoluene or dibenzyltoluene, may, for example, be mentioned. Among them, dodecylbenzene is particularly preferred, since it is readily separable with a large difference in boiling point from the desired tetraalkoxysilane, and it is relatively inexpensive. The amount of the solvent may suitably be selected within a range of from 1 ml to 100 ml, particularly from 1.5 to 10 ml, per 1 g of metallic silicon, for the industrial purpose. If the solvent is too little, the metallic silicon can not be made into a slurry, and the reaction can not be carried out. On the other hand, if it is too much, the productivity per unit will be low, since an apparatus of a large size will be required.

The catalyst for this reaction may, for example, be a basic catalyst such as an alkali metal alcoholate (JP-A-52-12133) or a copper catalyst such as copper chloride (JP-B-50-34538). The temperature for the reaction varies depending upon the solvent, the catalyst, etc., but is usually from 100 to 300° C.

The pressure during the reaction becomes a value having the pressure of hydrogen gas generated by the reaction added to the vapor pressure of the aliphatic alcohol and the hydrocarbon at the above reaction temperature. However, the reaction can be carried out also under a low pressure while purging the hydrogen gas generated.

Instead of the above one step reaction, it is possible firstly to obtain a mixed composition comprising a tetraalkoxysilane, a trialkoxyhydrosilane and an aliphatic alcohol and then to obtain the tetraalkoxysilane using an alkali metal or alkaline earth metal oxide or hydroxide as a catalyst (JP-A-63-166888).

The reaction composition thus obtained (hereinafter referred to as the "crude tetraalkoxysilane") contains the solvent, an unreacted aliphatic alcohol, insoluble components and a silicon-containing oligomer as a byproduct, in addition to the tetraalkoxysilane as the desired substance.

In the present invention, such a crude tetraalkoxysilane is purified by distillation to obtain a high purity tetraalkoxysilane. As a preferred embodiment of the distillation purification, it is preferred to separate the insoluble components, the silicon-containing oligomer which is a high boiling component as compared with the tetraalkoxysilane, and the solvent, from the crude tetraalkoxysilane. The insoluble components are those dispersed in a solid state in the reaction solution, and it can be separated by filtration or as a distillation residue together with high boiling components by means of e.g. a film evaporator. The insoluble components in the crude tetraalkoxysilane are poor in filterability in many cases, and the latter method is accordingly preferred for an industrial operation. In order to further reduce the content of high boiling components, it is preferred to carry out distillation treatment again.

Then, a component such as an unreacted aliphatic alcohol, which is a low boiling component as compared with the tetraalkoxysilane, is separated by distillation.

In a batch operation, following the aliphatic alcohol, the desired tetraalkoxysilane is distilled as a volatile component from the column top, whereby the preferred embodiment of the present invention is satisfied. In a continuous operation, the tetraalkoxysilane is withdrawn from the bottom, and it is accordingly preferred to further carry out distillation treatment to obtain it as a volatile component from the column top. By this operation, a tetraalkoxysilane having a very low content of metal impurities, can be obtained. As a purification method after removing the insoluble components, the unreacted aliphatic alcohol which is a low boiling component as compared with the tetraalkoxysilane, may firstly be separated by distillation and then separation of high boiling components by distillation may be carried out. Also in this case, in a batch operation, following the aliphatic alcohol, the desired tetraalkoxysilane will be distilled as a volatile component from the column top, whereby the desired embodiment of the present invention is satisfied. In a continuous operation, the tetraalkoxysilane will be withdrawn from the bottom, and it is preferred to further carry out distillation treatment to obtain it as a volatile component from the column top and thereby to carry out the separation from high boiling components. By this operation, a tetraalkoxysilane having a very low content of metal impurities can be obtained.

A usual distillation apparatus can be used for separation by distillation of the unreacted aliphatic alcohol and the trialkoxyalkylsilane which are low boiling components as compared with the tetraalkoxysilane. The operation may be carried out by either a batch system or a continuous system. To carry out the separation of the tetraalkoxysilane from the aliphatic alcohol, etc. precisely, plates or a packing material is disposed in the distillation column. The number of plates is from 5 to 50 plates, and the diameter of the column is determined depending upon the treating conditions. The pressure is usually atmospheric pressure or reduced pressure during the operation. To carry out the separation precisely, a part of the condensate from the column top is refluxed to the column, and the reflux ratio is usually from 0.1 to 5. In a case where the distillation is carried out in a batch system, the operation may be carried out while changing the reflux ratio depending upon the composition of the distillate.

Further, in the batch operation, following low boiling components, the high purity tetraalkoxysilane will be distilled. However, in a continuous operation, the high purity tetraalkoxysilane is withdrawn from a reboiler, whereby inclusion of minor metals from the apparatus is likely to take place during the operation. Therefore, it is preferred to apply distillation treatment again for high purification.

Here, it is preferred to carry out purification by distillation so that the trialkoxyalkylsilane content in the tetraalkoxysilane would be at most 0.3 wt % after separating low boiling components from the crude tetraalkoxysilane. Although the structures of the phosphorus compounds which are low boiling than the tetraalkoxysilane, are not clearly understood, it has been confirmed by experiments by the present inventors that the concentration of phosphorus sharply increases when the trialkoxyalkylsilane content in the tetraalkoxysilane exceeds 0.3 wt %.

On the other hand, a usual distillation apparatus can be used also for the separation between the tetraalkoxysilane and the high boiling components. Also in this case, to carry out separation of the tetraalkoxysilane from the high boiling components precisely, plates or a packing material is disposed in the distillation column. The number of plates is from 2 to 20 plates. The diameter of the column is determined depending upon the treating conditions, but will be designed so that the anti-flooding speed will be from 30 to 60% to prevent entrainment of high boiling component liquid mist. It is also effective to install a demister to prevent such entrainment. In such a manner, the entrainment can substantially be prevented, whereby inclusion of metals dissolved in the high boiling component liquid can be prevented. The pressure is usually atmospheric pressure or reduced pressure during the operation. To carry out the separation precisely, a part of the condensate from the column top will be refluxed to the column during the operation, and the reflux ratio is usually from 0.1 to 5. In a case where distillation is carried out in a batch system, the operation can be carried out by changing the reflux ratio depending upon the composition of the distillate.

Here, to separate high boiling components from the crude tetraalkoxysilane, purification by distillation is preferably carried out so that the temperature difference between the column top and the column bottom is at most 20° C. Although the structures of phosphorus compounds which are high boiling as compared with the tetraalkoxysilane, are not clearly understood, it has been confirmed by experiments that their concentration can be reduced to at most 10 ppb if the purification by distillation is carried out so that the temperature difference between the column top and the column bottom is at most 20° C. Even when the temperature difference between the column top and the column bottom exceeds 20° C., the silicon-containing oligomer, the solvent, etc. can usually be separated substantially completely. However, if the temperature difference exceeds 20° C., the concentration of phosphorus sharply increases.

In a case where the operation is carried out by a batch method, the temperature of the reboiler is measured, and distillation is terminated when the temperature difference between the column top and the column bottom reaches 20° C. On the other hand, in a case where the operation is carried out by a continuous method, the temperature difference between the column top and the column bottom can be maintained at most 20° C. by controlling the concentration of the tetraalkoxysilane as the liquid in the reboiler.

In a case where the purification after removal of insoluble components, is carried out by a continuous method, the method can be carried out in such a flow that firstly higher boiling components than the tetraalkoxysilane are separated, and then low boiling components are separated. However, by such a method, the high purity tetraalkoxysilane is finally withdrawn from a reboiler, and inclusion of minor metals from the apparatus is likely to result. Accordingly, it is preferred to apply distillation treatment again for high purification.

By the production method of the present invention as described above, it is readily possible to bring the content of a trialkoxyalkylsilane in the tetraalkoxysilane to a level of at most 0.3 wt %, preferably at most 0.15 wt %. When a synthetic quartz powder is prepared by baking a silica gel obtained by a sol-gel method using such a tetraalkoxysilane having a low content of a trialkoxyalkylsilane, formation of black powder can be substantially reduced during baking of the silica gel, and formation of fine bubbles in a shaped product of quartz glass prepared by using such a quartz powder containing little black powder, will be substantially reduced. The mechanism for this phenomenon is not necessarily clearly understood. However, it is considered that usual alkoxy groups substantially vanish by dealkoxylation or oxidation during the baking, but methyl groups are hardly removable, and their oxidation speed is slow, and they tend to remain as non-combustion carbon in the synthetic quartz powder, thus leading to black particles, and bubbles are likely to form during shaping of such a quartz powder.

On the other hand, with respect to boron and phosphorus which are minor impurity components and which have recently attracted an attention, pollution from atmosphere has heretofore been considered, but as a result of various studies by the present inventor, it has been found that they are entrained mainly from the tetraalkoxysilane as the starting material. Namely, an extremely good positive interrelation is observed between the boron and phosphorus contents in the tetramethoxysilane and the boron and phosphorus contents in the synthetic quartz powder or in its shaped product, respectively. The forms of boron and phosphorus in the tetramethoxysilane have not been clearly understood, but it is considered that they are organic boron and organic phosphorus compounds formed by a reaction of boron and phosphorus present in the metallic silicon to be used in the reaction, with methanol.

In the course of the study on separation of trimethoxymethylsilane and tetramethoxysilane, the present inventors have surprisingly found that the boron content decreases as the trimethoxymethylsilane content decreases, and further that the phosphorus content decreases as the temperature difference between the column top and the column bottom during separation by distillation of high boiling components, decreases. Namely, according to the production method of the present invention, a tetramethoxysilane having a boron content of at most 50 ppb can readily be obtained by controlling the trimethoxymethylsilane content in the tetramethoxysilane to be at most 0.3 wt %. For example, according to the production method of the present invention, the boron content will usually be at least 0.01 ppb if the trimethoxymethylsilane content in the tetramethoxysilane is adjusted to be at least 0.001 wt %. Further, according to the method of the present invention, a tetraalkoxysilane having a phosphorus content of at most 10 ppb, can be readily obtained by maintaining the temperature difference between the column top and the column bottom during distillation for separation of high boiling components to be at most 20° C. The trimethoxymethylsilane content may be measured by a known measuring method. For example, the measurement can be carried out with high sensitivity, when a gas chromatography such as FID method, may, for example, be employed. Further, the method for measuring the boron and phosphorus contents, is not particularly limited, and various conventional methods may be employed so long as they have adequate sensitivities. For example, accurate detection can be made by such means that the tetramethoxysilane is hydrolyzed by super-pure water and dissolved in hydrofluoric acid as $SiO_2$, followed by measurement by an ICP-MS method.

Further, it is of course desirable that the content of components other than trimethoxymethylsilane, boron and phosphorus in the high purity tetramethoxysilane of the present invention is likewise small. For example, the amount of remaining unreacted methanol is preferably at most 0.3 wt %. However, these other components are usually removed simultaneously during the process for removing the trimethoxymethylsilane.

Especially by obtaining the final purified product from the top of the distillation column, the high purity tetraalkoxysilane of the present invention can readily be obtained. Namely, it is a high purity tetraalkoxysilane obtained by purifying by distillation a crude tetraalkoxysilane obtained by a reaction of metallic silicon with an aliphatic alcohol, characterized in that the contents of Li, Na, K, Mg, Ca, Ti, Cr, Mo, W, Mn, Fe, Co, Ni, Cu, Zn and Al, are at most 50 ppb, respectively, as calculated as the respective elements. Here, the amount is the total amount of the respective components irrespective of their forms. Namely, it is a value calculated as each element irrespective of whether it is present in the form of various compounds. For example, Li, Na and K can be quantitatively analyzed by an atomic absorption method, and other components can be quantitatively analyzed by an ICP (inductively coupled plasma) method.

Further, according to the production method of the present invention, the content of each of these components can readily be made to be at most 20 ppb, further at most 10 ppb. Further, according to the production method of the present invention, not only these components, but also B can be made to be at most 50 ppb.

In the present invention, using the above high purity tetramethoxysilane, a synthetic quartz powder is produced by a sol-gel method. Here, the sol-gel method is one comprising a gelation step of hydrolyzing the starting material high purity tetramethoxysilane and further permitting a condensation reaction to proceed to obtain a gel, and a step of vitrifying the obtained gel by heat treatment. Firstly, the hydrolysis of the tetramethoxysilane by the sol-gel method is carried out by a conventional method by reacting the tetramethoxysilane with water.

As mentioned above, the trimethoxymethylsilane content in the tetramethoxysilane is at most 0.3 wt %, preferably at most 0.15 wt %. Further, the boron content is at most 50 ppb.

The amount of water to be used, is selected usually within a range of from 1 equivalent to 10 equivalents per equivalent of the methoxy groups in the tetramethoxysilane. At that time, an organic solvent compatible with water, such as an alcohol or an ether, may be used as mixed, as the case requires. Typical examples of the alcohol which can be used, include lower aliphatic alcohols such as methanol and ethanol.

For this hydrolytic reaction, an acid such as hydrochloric acid or acetic acid, or an alkali such as ammonia, may be incorporated as a catalyst. Further, it is of course necessary that all the substances to be introduced into the reaction system, such as water and the catalyst, are of high purity.

The gelation by condensation of the hydrolyzate, is carried out under heating or at room temperature. By heating, the gelation speed can be improved, and by adjusting the degree of heating, it is possible to adjust the time for gelation.

The obtained gel may be pulverized and then dried, or may be dried and then pulverized. In any case, pulverization is carried out so that the particle size after drying will be from 10 to 1,000 µm, preferably from 100 to 600 µm.

The drying is carried out under heating under atmospheric pressure or under reduced pressure. The heating temperature varies depending upon the conditions, but is usually from 50 to 200° C. Further, the operation can be carried out by either a batch method or a continuous method. The drying is preferably carried out usually to such a degree that the water content will be from 1 to 30 wt % in a wet amount standard.

The dry silica gel powder thus obtained is heated, so that pores be closed, and vitrified in a temperature range of from 700 to 1,300° C. to obtain a synthetic quartz powder. The temperature-raising pattern to a temperature region for heat treatment is one of factors governing the quality of the synthetic quartz powder. When the temperature is raised at a rate of from 50 to 200° C./hr, the remaining carbon concentration tends to be low, and formation of bubbles when formed into a shaped product, will be suppressed. The heating time varies depending upon the temperature condition, but is usually from 10 to 100 hours, and heating is preferably continued until the remaining silanol concentration will be at most 100 ppm, preferably at most 60 ppm. Further, it is preferred to carry out the heating while circulating air or an inert gas containing substantially no water, whereby the diminishing speed of silanol groups will be accelerated. Further, for the heat treatment, a container made of a material which is free from causing contamination of impurities to the synthetic quartz powder, such as one made of quartz, is used.

The synthetic quartz powder thus obtained, may be fused to obtain a shaped product of quartz glass. As the shaping method for this purpose, various types are available depending upon the applications of the shaped product. For example, when the application is a crucible, an arc melt method may be used, and if the application is a jig for IC, there may be mentioned a method wherein the powder is firstly formed into an ingot by an oxyhydrogen flame by a Verneuil's method, or a vacuum melting method wherein heat melting is carried out under vacuum by means of a casting mold made of carbon. By any method, if the synthetic quartz powder obtained by the production method of the present invention, is used, it is possible to obtain a shaped product having little formation of bubbles, which substantially contributes to the yield and the quality of the shaped product. Further, the synthetic quartz powder obtained by the method of the present invention contains substantially no boron or phosphorus. Accordingly, a shaped product of quartz glass prepared by using such a synthetic quartz powder will be one containing substantially no boron or phosphorus. When such a shaped product of quartz glass is used, for example, as a crucible for pulling up a silicon single crystal, there will be no elution of boron or phosphorus from the crucible, whereby a silicon single crystal containing substantially no boron can be obtained, which is extremely useful.

EXAMPLES

Now, the present invention will be described in further detail with reference to Examples. However, the present invention is by no means restricted to the following Examples.

Example 1

Using dodecylbenzene as a solvent, metallic silicon powder and methanol are reacted in the presence of a copper catalyst to obtain a mixed composition comprising tetramethoxysilane, trimethoxyhydrosilane, unreacted methanol and dodecylbenzene. Then, using calcium carbonate as a catalyst, the trimethoxyhydrosilane was converted substantially in its entire amount to tetramethoxysilane, to obtain a composition as identified in Table 1.

TABLE 1

| Name of substance | Composition (wt %) |
|---|---|
| Methanol | 17.4 |
| Trimethoxymethylsilane | 0.4 |
| Tetramethoxysilane | 68.9 |
| Dodecylbenzene and HB | 13.3 |

HB: Insolubles such as a silicon-containing oligomer and calcium carbonate

Then, the composition as identified in Table 1, was continuously supplied to a film evaporator, whereby HB and dodecylbenzene were separated at 110° C., to obtain a composition as identified in Table 2.

TABLE 2

| Name of substance | Composition (wt %) |
|---|---|
| Methanol | 19.9 |
| Trimethoxymethylsilane | 0.5 |
| Tetramethoxysilane | 77.2 |
| Dodecylbenzene and HB | 2.4 |

Further, the concentrations of metal impurities in this composition were determined by an analysis and were found to have the values shown in Table 3.

TABLE 3

| Component | Li | Na | K | Mg | Ca | Ti | Cr | Mo | W |
|---|---|---|---|---|---|---|---|---|---|
| Concentration (ppb) | <10 | 20 | <10 | <10 | 250 | <10 | 20 | <10 | <10 |
| Component | Mn | Fe | Co | Ni | Cu | Zn | B | Al | |
| Concentration (ppb) | <10 | 60 | <10 | <10 | <10 | <10 | 300 | <10 | |

Using an Oldarshow type distillation apparatus (number of plates: 20 plates) made of glass and having a reflux condenser at the top, the composition as identified in Table 2 was distilled under atmospheric pressure by a batch operation (reflux ratio: 3). A distillate comprising methanol as the main component, obtained at the column top temperature of lower than 120° C., was collected as the initial fraction, and then a fraction obtained at the column top temperature of from 120 to 121° C. was collected as the main fraction. The maximum temperature difference between the column top and the column bottom was 5° C. The main fraction was analyzed and found to have the composition shown in Table 4. Further, the boron content was measured and found to be not more than 5 ppb, and the phosphorus content was measured and found to be 0.8 ppb (the boron and phosphorus contents are the values measured by ICP-MS method).

TABLE 4

| Name of substance | Composition (wt %) |
| --- | --- |
| Methanol | 0.1 or less |
| Trimethoxymethylsilane | 0.1 or less |
| Tetramethoxysilane | 99.8 or more |
| Dodecylbenzene | 0.1 or less |

Using an Oldarshow type distillation apparatus (number of plates: 20 plates) made of glass and having a reflux condenser at the top, the composition as identified in Table 2 was distilled under atmospheric pressure by a batch operation (reflux ratio: 3), to obtain a tetramethoxysilane having the composition shown in Table 5. The boron content of this tetramethoxysilane was measured and found to be not higher than 5 ppb, and the phosphorus content was measured and found to be 0.8 ppb (the boron and phosphorus contents are the values measured by ICP-MS method).

TABLE 5

| Name of substance | Composition (wt %) |
| --- | --- |
| Methanol | 0.1 or less |
| Trimethoxymethylsilane | 0.1 or less |
| Tetramethoxysilane | 99.8 or more |
| Dodecylbenzene | 0.1 or less |

Then, this tetramethoxysilane was reacted with water to obtain a bulky wet gel. This gel was pulverized to at most 1 mm and then dried to obtain a powdery dry gel. Then, this powdery dry gel was put in a container made of quartz and maintained at 1,200° C. for 30 hours in an electric furnace. The obtained quartz powder had a boron content of not higher than 5 ppb and a phosphorus content of 2.5 ppb. No formation of black particles was observed.

Then, this quartz powder was melted in an oxyhydrogen flame (Verneuil's method) to obtain a rod-shaped ingot. No substantial bubbles were observed in the ingot.

Example 2

The same operation as in Example 1 was carried out except that a tetramethoxysilane having a boron content of 10 ppb and a phosphorus content of 2.0 ppb and having a composition as shown in Table 6, was used. The obtained quartz powder had a boron content of 25 ppb and a phosphorus content of 6.0 ppb, and one black particle in 50 g was visually observed.

TABLE 6

| Name of substance | Composition (wt %) |
| --- | --- |
| Methanol | 0.12 |
| Trimethoxymethylsilane | 0.14 |
| Tetramethoxysilane | 99.7 |
| Dodecylbenzene | 0.1 or less |

Then, this quartz powder was formed into a rod-shaped ingot in the same manner as in Example 1. Some bubbles were observed in the ingot.

Comparative Example 1

Using a tetramethoxysilane having a boron content of 60 ppb and a phosphorus content of 20 ppb and having a composition as shown in Table 7, a quartz powder was obtained in the same manner as in Example 1. This quartz powder had a boron content of 200 ppb and a phosphorus content of 65 ppb, and ten black particles in 50 g were visually observed.

TABLE 7

| Name of substance | Composition (wt %) |
| --- | --- |
| Methanol | 0.8 |
| Trimethoxymethylsilane | 0.5 |
| Tetramethoxysilane | 98.7 |
| Dodecylbenzene | 0.1 or less |

Further, this quartz powder was used to obtain a rod-shaped ingot in the same manner as in Example 1. A large amount of bubbles were formed in the ingot.

Example 3

Distillation was carried out in the same manner as in Example 1 except that the column top temperature during collection of the main fraction was from 118 to 121° C., and the main fraction was collected until the reboiler temperature rose to 126° C. The collected composition was analyzed and found to have a composition as shown in Table 8. Further, the boron content was measured and found to be 10 ppb, and the phosphorus content was measured and found to be 0.9 ppb.

TABLE 8

| Name of substance | Composition (wt %) |
| --- | --- |
| Methanol | 0.12 |
| Trimethoxymethylsilane | 0.14 |
| Tetramethoxysilane | 99.7 |
| Dodecylbenzene | 0.1 or less |

Comparative Example 2

Distillation was carried out in the same manner as in Example 1 except that the column top temperature during collection of the main fraction was from 80 to 121° C., and the main fraction was collected until the reboiler temperature rose to 126° C. The collected composition was analyzed and found to have a composition as shown in Table 9. Further, the boron content was measured and found to be 60 ppb, and the phosphorus content was measured and found to be 1.5 ppb.

TABLE 9

| Name of substance | Composition (wt %) |
| --- | --- |
| Methanol | 0.8 |
| Trimethoxymethylsilane | 0.5 |
| Tetramethoxysilane | 98.7 |
| Dodecylbenzene | 0.1 or less |

Examples 4 and 5 and Comparative Example 3

Using tetramethoxysilanes obtained in Examples 1 and 2 and Comparative Example 1, each was reacted with water to obtain a bulky wet gel. The gel was pulverized so that the particle size became at most 1 mm and then dried to obtain a powdery dry gel. Then, the powdery dry gel was put into a container made of quartz and maintained at 1,200° C. for 30 hours in an electric furnace. The boron content and the number of black particles formed in the obtained quartz powder were, respectively, found to have the values shown in Table 10.

TABLE 10

| | Tetramethoxysilane used | Boron content | Number of black particles formed | Phosphorus content |
|---|---|---|---|---|
| Example 4 | Obtained in Example 1 | 5 ppb or less | 0 particle | 2.5 ppb |
| Example 5 | Obtained in Example 2 | 25 ppb | 1 particle | 3.0 ppb |
| Comparative Example 2 | Obtained in Comparative Example 1 | 200 ppb | 10 particles | 4.7 ppb |

Number of black particles formed: Number of black particles detected in 50 g of the quartz powder Examples 6 and 7 and Comparative Example 4

The quartz powders obtained in Examples 4 and 5 and Comparative Example 3 were melted in an oxyhydrogen flame (Verneuil's method) to obtain rod-shaped ingots. The states of bubbles present in the ingots were compared, and the results are shown in Table 11.

TABLE 11

| | Quartz powder used | State of bubbles |
|---|---|---|
| Example 6 | Obtained in Example 3 | Almost nil |
| Example 7 | Obtained in Example 4 | Formed slightly |
| Comparative Example 3 | Obtained in Comparative Example 2 | Formed in a large amount |

Examples 8 and 9 and Comparative Example 5

Using a stainless steel packed column type distillation apparatus (number of theoretical plates: 14 plates) having a reflux condenser at the top, the composition as identified in Table 2 in Example 1 was distilled under atmospheric pressure by a continuous operation (reflux ratio: 3) to separate low boiling components. Then, using a stainless steel packed column type distillation apparatus (number of theoretical plates: 14 plates) having a reflux condenser at the top, installed in a series, high boiling components were separated by distillation under atmospheric pressure by a continuous operation. The operation was carried out by changing only the distillation condition for high boiling components while maintaining the distillation condition for low boiling components to be the same. Namely, the column top and bottom temperatures during distillation for separation of high boiling components were respectively controlled to the values shown in Table 12. The collected compositions were analyzed and found to have compositions as identified in Table 12. Further, the phosphorus contents were measured and found to have the values shown in Table 12.

TABLE 12

| | | Example 3 | Example 4 | Comparative Example 1 |
|---|---|---|---|---|
| Column top temperature | | 121° C. | 121° C. | 121° C. |
| Column bottom temperature | | 125° C. | 130° C. | 160° C. |
| Temperature difference between top and bottom: | | 4° C. | 9° C. | 39° C. |
| Methanol | wt % | 0.2 | 0.2 | 0.2 |
| Trimethoxymethylsilane | wt % | 0.2 | 0.2 | 0.2 |
| Tetramethoxysilane | wt % | 99.6 | 99.6 | 99.6 |

TABLE 12-continued

| | | Example 3 | Example 4 | Comparative Example 1 |
|---|---|---|---|---|
| Dodecylbenzene | wt % | 0.1 or less | 0.1 or less | 0.1 or less |
| Phosphorus concentration ppb | | 2 | 3 | 23 |

Examples 10 and 11 and Comparative Example 6

Using the tetramethoxysilanes obtained in Example 8 and 9 and Comparative Example 5, each was reacted with water to obtain a bulky wet gel. The gel was pulverized so that the particle size became at most 1 mm and then dried to obtain a powdery dry gel. Then, the powdery dry gel was put into a container made of quartz and maintained at 1,200° C. for 30 hours in an electric furnace. The phosphorus contents in the obtained quartz powders were, respectively, found to have the values shown in Table 13.

TABLE 13

| | Tetramethoxysilane used | Phosphorus content |
|---|---|---|
| Example 10 | Obtained in Example 8 | 5 ppb |
| Example 11 | Obtained in Example 9 | 8 ppb |
| Comparative Example 6 | Obtained in Comparative Example 5 | 60 ppb |

Examples 12 and 13 and Comparative Example 7

The quartz powders obtained in Examples 10 and 11 and Comparative Example 6 were melted in an oxyhydrogen flame (Verneuil's method) to obtain rod-shaped ingots. The contents of phosphorus present in the ingots were, respectively, found to have the values shown in Table 14.

TABLE 14

| | Quartz powder used | Phosphorus content |
|---|---|---|
| Example 12 | Obtained in Example 10 | 4 ppb |
| Example 13 | Obtained in Example 11 | 7 ppb |
| Comparative Example 7 | Obtained in Comparative Example 6 | 58 ppb |

Example 14

Using a distillation apparatus (SUS-304, concentration section: 3 plates, recovery section: 4 plates) having a reflux condenser at the top, the composition as identified in Table 2 in Example 1 was distilled under atmospheric pressure by a continuous operation (reflux ratio: 3). At that time, the column top temperature was controlled to be 65° C., and the column bottom temperature was controlled to be 120° C. The composition of the liquid withdrawn continuously from the bottom is shown in Table 15, and the values obtained by an analysis of the concentrations of metal impurities in this liquid are shown in Table 16.

TABLE 15

| Name of substance | Composition (wt %) |
|---|---|
| Methanol | 0.5 |
| Trimethoxymethylsilane | 0.3 |
| Tetramethoxysilane | 96.2 |
| Dodecylbenzene and HB | 3.0 |

TABLE 16

| Component | Li | Na | K | Mg | Ca | Ti | Cr | Mo | W |
|---|---|---|---|---|---|---|---|---|---|
| Concentration (ppb) | <10 | 25 | <10 | <10 | 310 | <10 | 40 | <10 | <10 |
| Component | Mn | Fe | Co | Ni | Cu | Zn | B | Al | |
| Concentration (ppb) | <10 | 100 | <10 | <10 | <10 | <10 | 35 | <10 | |

Example 15

Using the same distillation apparatus as used in Example 14, the liquid having a composition as identified in Table 15 or 16 obtained in Example 14, was distilled under atmospheric pressure by a continuous operation (reflux ratio: 1). At that time, the column top temperature was controlled to be 120° C., and the column bottom temperature was controlled to be 150° C. The composition of the liquid withdrawn continuously from the column top is shown in Table 17, and the values obtained by an analysis of the concentrations of metal impurities in this liquid, are shown in Table 18.

TABLE 17

| Name of substance | Composition (wt %) |
|---|---|
| Methanol | 0.5 |
| Trimethoxymethylsilane | 0.3 |
| Tetramethoxysilane | 99.2 |
| Dodecylbenzene and HB | 0 |

TABLE 18

| Component | Li | Na | K | Mg | Ca | Ti | Cr | Mo | W |
|---|---|---|---|---|---|---|---|---|---|
| Concentration (ppb) | <10 | <10 | <10 | <10 | <10 | <10 | <10 | <10 | <10 |
| Component | Mn | Fe | Co | Ni | Cu | Zn | B | Al | |
| Concentration (ppb) | <10 | <10 | <10 | <10 | <10 | <10 | 37 | <10 | |

INDUSTRIAL APPLICABILITY

According to the present invention, it is possible to obtain a high purity tetraalkoxysilane having an extremely small content of metal impurities, which is useful as a starting material for a synthetic quartz powder or a shaped product of quartz glass, as well as a synthetic quartz powder and a shaped product of quartz glass employing it.

What is claimed is:

1. A method for producing a high purity synthetic quartz comprising:
    a) hydrolyzing and condensing a tetramethoxysilane having a trimethoxymethylsilane content of at most 0.3 wt. %, to form a gel; and
    b) vitrifying said gel by heat treatment.

2. The method of claim 1, wherein said tetramethoxysilane is prepared by:
    i) reacting an aliphatic alcohol with metallic silicon in the presence of a solvent and a catalyst, wherein an amount of said aliphatic alcohol is from 3 to 50 moles per mole of metallic silicon and an amount of solvent is from 1 to 100 ml per gram of metallic silicon;
    ii) distilling tetramethoxysilane.

3. The method of claim 1, wherein said heat treatment is at a temperature of 700 to 1,300° C.

4. The method of claim 1, wherein said tetramethoxysilane has a boron content of at most 50 pbb.

5. The method of claim 1, wherein said tetramethoxysilane has a phosphorous content of at most 10 pbb.

6. A method for producing a shaped product of quartz glass, comprising:
    a) hydrolyzing and condensing a tetramethoxysilane having a trimethoxymethylsilane content of at most 0.3 wt. %, to form a gel; and
    b) vitrifying said gel by heat treatment to form a high purity synthetic quartz powder; and
    c) melt-forming said high purity synthetic quartz powder.

7. The method of claim 6, wherein said tetramethoxysilane is prepared by:
    i) reacting an aliphatic alcohol with metallic silicon in the presence of a solvent and a catalyst, wherein an amount of said aliphatic alcohol is from 3 to 50 moles per mole of metallic silicon and an amount of solvent is from 1 to 100 ml per gram of metallic silicon;
    ii) distilling tetramethoxysilane.

8. The method of claim 6, wherein said heat treatment is at a temperature of 700 to 1,300° C.

9. The method of claim 6, wherein said tetramethoxysilane has a boron content of at most 50 pbb.

10. The method of claim 6, wherein said tetramethoxysilane has a phosphorous content of at most 10 pbb.

11. The method of claim 6, further comprising preparing a high purity tetramethoxysilane comprising:
    i) reacting metallic silicon and methanol; and
    ii) purifying a crude tetramethoxysilane by distillation from a top of a distillation column.

12. The method of claim 11, wherein distillation is conducted by a continuous operation using a plurality of distillation equipment.

13. The method of claim 6, further comprising preparing a high purity tetramethoxysilane comprising:
    i) reacting metallic silicon and methanol; and
    ii) purifying a crude tetramethoxysilane by precise distillation in a distillation column, controlling a temperature difference between a top of said distillation column and a bottom of said distillation column, to be at most 20° C.

14. The method of claim 6, further comprising pulverizing said gel prior to said vitrifying.

* * * * *